Feb. 17, 1959     R. A. INGLIS     2,873,865
APPARATUS FOR THE TRANSPORT AND STORAGE OF VEHICLES
Filed May 1, 1957     3 Sheets-Sheet 2
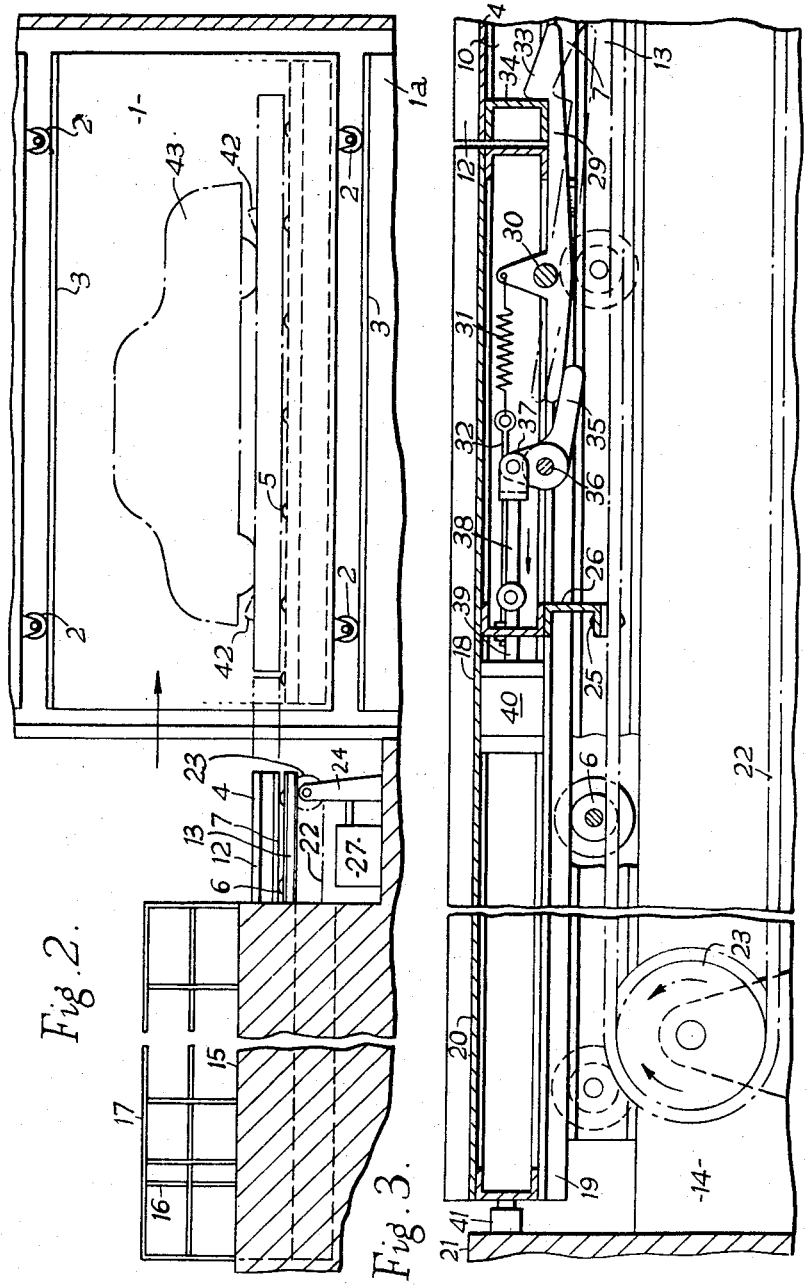

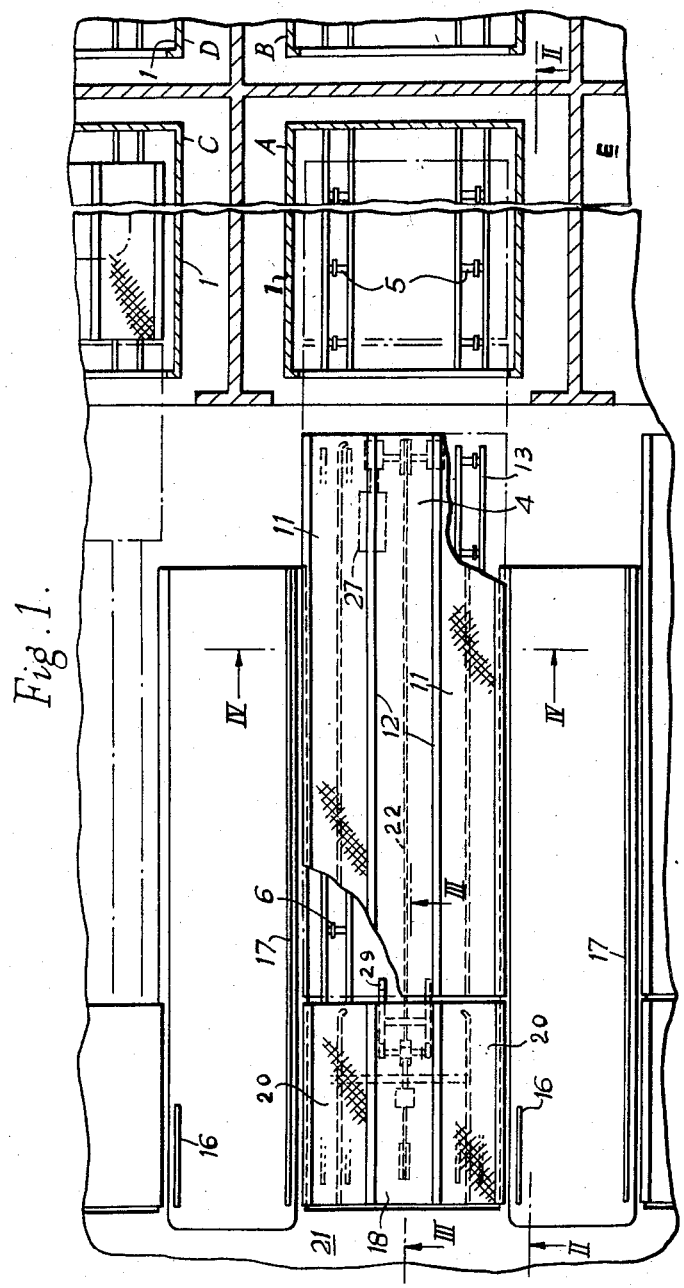

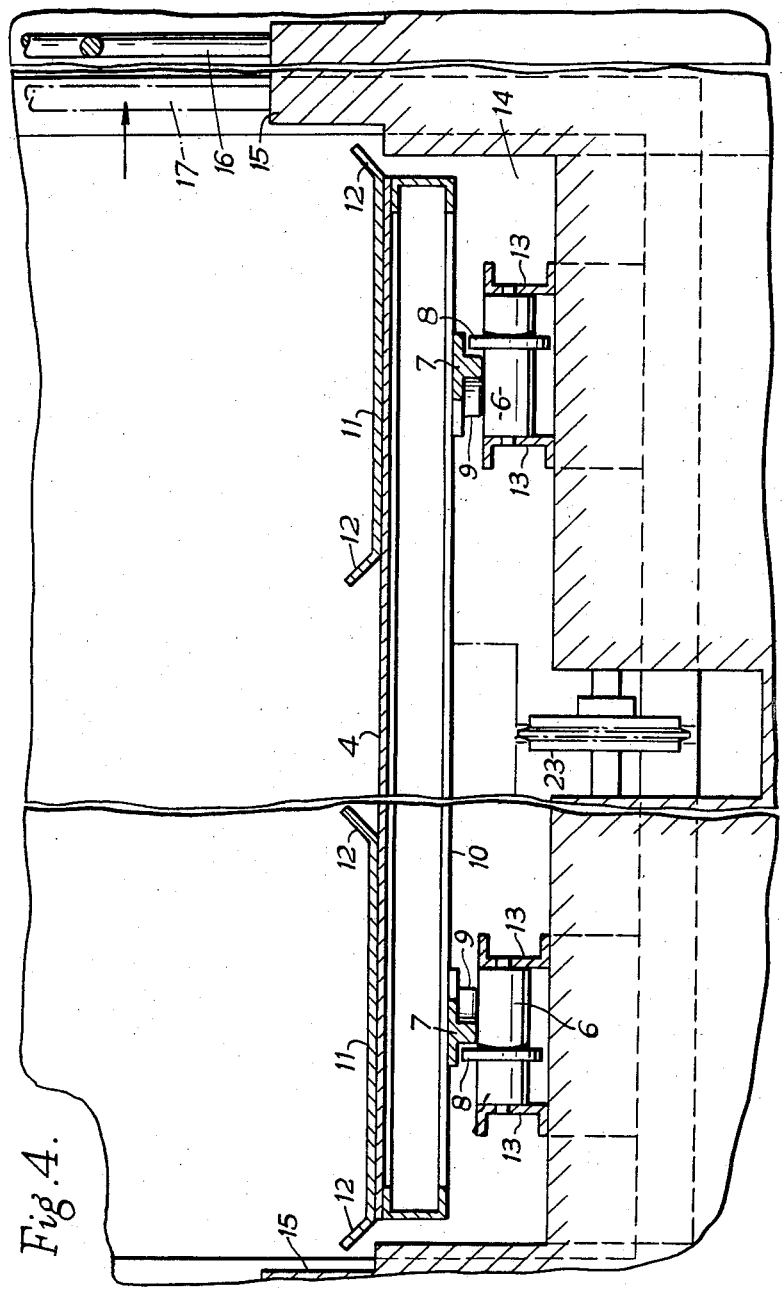

United States Patent Office 2,873,865
Patented Feb. 17, 1959

2,873,865

APPARATUS FOR THE TRANSPORT AND STORAGE OF VEHICLES

Ronald A. Inglis, Orpington, England, assignor to Eugene O'Sullivan, Chislehurst, England Application May 1, 1957, Serial No. 656,448

Claims priority, Great Britain May 2, 1956

15 Claims. (Cl. 214—16.1)

This invention relates to apparatus for the storage or garaging of vehicles. The invention is more especially applicable to such apparatus which makes use of a lift having one or a number of cages, platforms or the like (hereinafter referred to generally as cages) in or on which the vehicles are placed, either for storage in the actual cages or for the purpose of being raised or lowered to another level where the vehicles are removed from the cages for storage purposes.

The invention is primarily concerned with apparatus in which the vehicles are garaged in the individual cages and it will now be more specifically described as applied to apparatus of this kind.

One type of such apparatus takes the form of a lift having a plurality of cages which are arranged one above the other in two columns, means being provided for raising the cages in one column, while lowering the cages in the other column, and also for transferring the uppermost cage in the ascending column to the top of the descending column and for transferring the lowermost cage in the descending column to the bottom of the ascending column.

With such apparatus, one form of which is described in the Specification of United Kingdom Patent No. 693,-170, any desired cage can be brought to a loading position, which may conveniently be at or near the bottom of one of the columns, at which position a vehicle to be garaged can be driven into the cage and left. When another cage is to be loaded the apparatus is operated to move the cages up and down the respective columns in order to bring another empty cage to the position for loading. In this way all the cages can be filled with vehicles to be garaged.

When it is desired to remove one of the vehicles the apparatus is operated to bring the desired cage to the loading position (or to a separate unloading position), at which the vehicle can be driven out of the cage.

This form of apparatus enables a large number of vehicles to be garaged in a very small area, since it reduces to a low value the amount of room which must be allowed for the manoeuvring of the vehicles, while it provides other advantages. However, the apparatus of this kind which has been proposed or constructed in the past suffers from certain limitations or disadvantages. These are due, in large part, to the need for driving the vehicles into and out of the lift cages. Among the disadvantages resulting from this practice are the need for making the cages considerably wider than the widest vehicle which they will accommodate, in order to leave room for the driver to open the door and to leave the vehicle after the latter is in the cage, and to the stringent safety precautions which have to be taken to comply with various safety regulations and bye-laws when people, and particularly members of the general public, are admitted to the cages of lifts and other apparatus not designed specifically as passenger lifts.

It is, accordingly, one of the principal objects of the present invention to provide improvements in apparatus for the garaging of vehicles by means of which the above disadvantages may be considerably reduced.

According to the invention apparatus is provided for the garaging of vehicles, comprising a lift having at least one cage adapted to receive a vehicle to be garaged and means for moving the cage to and from a position at which the vehicle can be loaded into or removed from the cage, wherein the apparatus also includes at least one platform, which is adapted to support the vehicle and is movable into and out of the cage at the loading and unloading position, and operating means for effecting the said movements of the platform.

Although certain features of the invention might be applied to apparatus having only a single cage, or a small number of cages, which is or are used for conveying the vehicles from a loading position to a separate storage position, where they are removed from the cage or cages, it is more particularly intended for apparatus having a substantial number of cages in which the vehicles are actually stored or garaged and from which they are only removed when storage is no longer required.

Furthermore, while the invention, in certain of its aspects, might be applied to apparatus in which the cages are moved from the loading position, for example by means of a conveyor or the like, in a more or less horizontal or inclined direction, it is more particularly applicable and will be described as applied to apparatus of the kind previously referred to in which the cages are arranged in two vertical columns.

It will be appreciated that when the vehicles are actually garaged in the cages a number of separate platforms will be provided, numbering at least one for each cage, since the vehicles will remain on the platforms while in the cages.

The use of a number of separate platforms offers important advantages. Thus, when garaging a motor vehicle, it can be driven on to a platform at the loading position, this being done by the owner, if desired. Plenty of space and facilities can be provided at this point to facilitate the driving of the vehicle on to the platform and its correct positioning on the latter and for the easy exit of the driver from the vehicle. Since at this time the platform is clear of the lift such stringent safety precautions are not necessary as would be required if the driver had to drive the vehicle actually into the lift cage.

The vehicle can now be locked and can be secured against movement on the platform by means of chocks or other means.

The mechanism is then operated to move the platform carrying the vehicle into the desired cage of the lift, after which the apparatus can be operated to raise or lower the cage and to move another cage into position for loading.

When it is desired to remove the garaged vehicle the appropriate cage is brought to the loading (or to a separate unloading) position, at which the mechanism is operated to remove the platform carrying the vehicle from the cage. When the platform and vehicle are clear of the cage the vehicle can be entered and driven away.

With this arrangement the cages can be made only very slightly wider than the widest vehicle for which they are designed, which reduces the cost of the apparatus and enables a greater number of vehicles to be stored in a given space, there is no need for any person to enter the lift cages at any time (except for cleaning and routine maintenance) and there is no risk of the lift or its cages being damaged by the vehicles being driven into and out of them.

The invention in its various aspects will now be more fully described, by way of example, as applied to a vehicle storage lift of the kind having a plurality of cages arranged in two adjacent columns, up and down which the cages are moved to bring any desired one of the cages to a loading and unloading position.

The invention will be more fully described by way of example with reference to the accompanying drawings, in which:

Figure 1 is a diagrammatic plan view, partly cut-away and in section, showing part of the storage lift and the mechanism for loading vehicles into the cages of the lift and for unloading the vehicles;

Figure 2 is a vertical section of the apparatus shown in Figure 1, taken on the line II—II;

Figure 3 is a detail section, to a larger scale, taken on the line III—III of Figure 1;

Figure 4 is a detail view, also to a larger scale, taken on the line IV—IV of Figure 1.

Referring to the drawings, the apparatus comprises one or more lift units each containing a number of lift cages 1 which are superimposed one upon the other in vertical columns. In the drawings, two such units are shown, arranged side by side, one unit comprising two columns of cages A and B and the next unit comprising two similar columns C and D. As many units may be provided, arranged side by side in this manner as may be desired and the provision for a third unit is indicated at E in Figure 1.

The cages 1 are shown purely diagrammatically in the drawings, but each is constructed of a suitable metal framework which may be fitted with any desired panels to provide a floor, side walls and roof, together with a rear end wall if required. The front or left hand end of each cage is open.

Each cage is provided with wheels or rollers 2 which are adapted to run on rails 3, mounted on the tops of other cages, so that in a column each cage can be supported on and can run along the cage below it. At the bottom of each column rails (not shown) are provided for supporting the lowermost cages in the two columns and for enabling a cage to be moved from the bottom of one column to the bottom of the other column of that unit. At the top of each unit connecting rails are provided so that the uppermost cage in one column can be run off the cage supporting it on to the top of another cage at the same level in the other column. Suitable means are provided for moving the upper and lower cages from one column to the other and for supporting the remaining cages in the columns during the movement of the lowermost cage from one to the other. Suitable means, which preferably take the form of hydraulic rams arranged to engage the lowermost cages in the respective columns, are provided for raising the cages in one column and for lowering the cages in the other column. The mechanism for raising and lowering the cages, for supporting them in the columns, for transferring them between the columns and for controlling such operations forms no part of the present invention. It may be of the kind described in the specification of United Kingdom Patent No. 693,170. Alternatively, other forms of mechanism may be used for operating the cages.

In accordance with the present invention, there is provided, for each of the cages 1, a vehicle carrying platform 4, which is movable into and out of the cage at a loading position. This position is conveniently at ground level, which may correspond to the lowest or to any other desired cage in a column, depending on the extent to which the columns are taken down below ground level. For example, referring to Figure 2, the cage 1 which is at the loading position, may be supported by the lowermost cage 1a, which is the one which has been transferred from or which is to be transferred to the other column, depending on the direction of movement of the cages in the columns.

While it would be possible to provide the platforms 4 with their own wheels, which would run along rails or guides provided in the cages and at the loading position, it is preferred to provide each of the cages 1 with two sets of rollers 5 and to provide corresponding rollers 6 at the loading position, which rollers are adapted to support rails 7 provided on the undersides of the platforms 4. By using a number of such rollers, instead of flanged or other wheels mounted on the platforms, it is found that a number of advantages are obtained. In particular, the rollers and their bearings can be made smaller and of simpler construction than would be necessary in the case of wheels provided on the platforms themselves, with a valuable saving in the height of the lift cages needed to accommodate the wheels. This enables more vehicles to be stored in a lift of a given height.

Flanges 8 (Figure 4) on the rollers 5 and 6 serve to guide the platforms laterally, while in order to facilitate the transference of a platform from one set of rollers to the next the ends of the rails 7 may be turned inwardly at the end of the platform, as is indicated at 9 in Figure 4.

According to an alternative arrangement, one series of rollers, 5 and 6, might be used for supporting the platforms 4 as described, another series being provided for guiding the platforms. These latter rollers might, for example, be arranged to engage the sides of the platforms (or guides mounted on the latter) or the platforms could themselves be provided at each side with rollers running on fixed guides provided in the cages and at the loading position.

Each of the platforms 4 is constructed of a suitable framework, indicated at 10, which carries either a floor extending over substantially the full width of the platform, or alternatively two separate runways, indicated at 11, which are suitably spaced to receive the wheels of the vehicles to be garaged. If desired, drip trays could be provided between the runways 11 to catch any spilled oil.

As shown, the runways 11 may be formed with raised edges 12, in order to prevent the wheels of the vehicles from running off them.

Instead of forming the platforms as frameworks carrying separate floors or runways, a form of integral construction in which the runways are designed to provide part at least of the strength and stiffness required for the platforms as a whole could be used. This may be done by utilising a form of corrugated construction for the material forming the runways or flooring.

According to one preferred arrangement, the material is shaped to provide on its upper surface, two parallel longitudinal channels which form runways having sloping sides which provide guides for ensuring that the wheels of the vehicle are correctly positioned when a vehicle is driven on to a platform. The bottoms of these channels form, underneath the platform, two longitudinal ribs which may be arranged either to run directly on the rollers 5 and 6 or which may carry rails corresponding to the rails 7. The material will also be formed between the runways with additional transverse and/or diagonal corrugations for the sake of strength, while the side edges of the material could be bent down to form side members of angle, channel or box section. Additional longitudinal transverse and/or diagonal frame members may be provided as required for extra strength and stiffness.

The rollers 6 in the loading position may be journalled between and supported by pairs of fixed rails 13 mounted in a channel or pit 14, which is provided for each unit at the loading position.

Similar rails carry the rollers 5 in the cages 1. At both sides of each of the channels 14, and between the channels of the adjacent units, raised footways 15 are provided on to which the driver of a vehicle can step when getting out of a vehicle which he has driven on to the platform at a loading position. Safety rails such as 16 and 17 may be provided on one or both sides of the footways along such parts of the edges of the latter as will not be used by persons getting into and out of vehicles. Preferably, the safety rails 16 and 17 are constructed in movable sections which can be moved and replaced and individually positioned as may be required to suit particular circumstances. The footways can, for this purpose be provided with sockets or the like suitably positioned to receive the feet of the posts of the sections of rail.

The use of removable rails has the great advantage of facilitating the maintenance and repair of the mechanism and the removal of any vehicles which may break down when on the platform.

The ends of the footways 15 projecting from the lift units may be of rounded or tapered form, when viewed in plan, in order to facilitate the manoeuvring and guiding of the vehicles on to and off the platforms. The footways may also be provided, particularly near the said outer ends thereof, with guide faces adapted to guide the wheels of the vehicles into the correct positions on the platforms. In order to prevent damage to the tyres and wheels, these guide faces may, instead of being vertical, be of inclined or of rounded concave form when seen in section.

The mechanism for moving the platforms 4 into and out of the lift cages 1 will now be described. This mechanism comprises a reciprocable operating member in the form of a trolley or small platform 18, which is provided on its underside with rails 19 which are similar to the rails 7 of the platforms 4 and which likewise run on the rollers 6. The operating trolley 18 may be of similar construction and the same width as the platforms 4, but it is of considerably reduced length. As in the case of the platforms 4, it carries runways 20 (corresponding to the runways 11), along which a vehicle can be driven from the floor 21 at the end of the well 14 on to the platform 4, when the platform and the trolley 18 are at their forward or loading positions, as shown in full lines in the drawings.

In order to move the platform 4 into the lift cage 1, the trolley 18, pushing the platform 4, is driven to the right, as shown in the drawings, and into the position shown in broken lines. This is done by means of an endless chain 22 which is trained about sprockets 23 carried by supports 24 mounted in the well 14. The chain 22 is connected at 25 to a bracket 26 projecting downwardly from the trolley 18 and it is driven by means of an electric motor 27 (Figure 2) which drives one of the sprockets 23 through suitable gearing.

Alternatively, the trolley 18 may be operated hydraulically by means of a ram. This ram could be connected to the chain 22 or directly to the trolley.

If desired, compressed air could be used for operating the trolley 18, using either a compressed air motor in place of the electric motor 27 or a compressed-air-operated ram. The trolley 18 engages directly against the platform 4 to push the latter into the cage 1, after which the return movement of the trolley moves it clear of the cage, thus leaving the latter free to be raised or lowered so as to bring a fresh cage into the loading position.

In order to enable the trolley to withdraw the platform 4 from the cage, the trolley is provided at its front end with a pair of latches 29 which are fixed to a shaft 30, journalled in suitable bearings. Tension springs 31, which are connected to adjustable anchorages 32, bias the leading ends 33 of the latches 29 upwardly into positions in which they engage behind a transverse member 34, forming part of the frame 10 of the platform 4. The ends 33 of the latches 29 are so shaped that when the trolley 18 is moved up to the platform 4 the latches 29 engage automatically.

In order to enable the latches 29 to be released, so as to leave the platform 4 in the cage 1 when the trolley 18 is withdrawn, a release mechanism is provided comprising a pair of release members 35 which are secured to a shaft 36. This shaft also carries an arm 37 which is connected by means of a link 38 to the armature 39 of an electro-magnet, which is indicated at 40. Energisation of this electro-magnet raises the arms 35 and pivots the latches 29, thus disengaging the latter from the platform 4.

Suitable limit switches (not shown) and buffers, such as that indicated at 41, are provided for limiting the running of the motor and the movements of the trolley 18 and platform 4, particularly when the latter is driven into a cage.

The working of the apparatus as a whole may be controlled (if desired from a remote control point) by any suitable electrical and/or mechanical means and all necessary or desirable interlocks and safety devices may be provided. These include, particularly, means for ensuring that the platform cannot be moved into or out of the cage except when the latter is stationary at the loading position, while the cage itself cannot be raised or lowered except when the trolley 18 has been withdrawn from it, either leaving the platform in the cage or having completely drawn the platform out of the cage.

Retractable chocks such as are indicated at 42 may be provided on each platform for retaining the vehicle (indicated at 43) in position on the platform. These chocks may be operated by hand, when each vehicle is loaded on to a platform, or they may be operated from the main control position. Interlocking means may be provided to prevent movement of the cage until the chocks have been raised.

If desired, several sets of chocks may be provided to accommodate vehicles of different wheel bases.

Any suitable means, including guide and signal lights may be provided for assisting and controlling the driving of vehicles on to and off the platform 4, which is done over the trolley 18. Means such as warning lights or stops may be provided for preventing vehicles from being driven over the edge of the floor 21 except when the trolley 18 with a platform 4 are in position to receive them, that is in the positions shown in full lines in the drawings.

For additional safety, each of the wells 14 may be provided with a sliding or roller shutter which is located behind and is connected to the trolley 18 so that when the latter is moved forward to push the platform 4 into the cage or to withdraw the platform from the cage, the well is covered by the shutter, instead of being left open.

Alternatively, the floor 21 could be extended over the position normally occupied by the trolley 18, up to the rear edge of the platform 4, so that the vehicles would be driven directly on to the platform without touching the trolley 18. In this case, the trolley 18 could be made of sufficient size so that when it is moved forward it provides a surface which completely covers the part of the well 14 behind the platform 4. This would provide for increased safety.

Alternatively, the trolley 18 could be simply replaced by a much smaller operating member, which might take the form of a slide or small wheeled trolley running on suitable guides or rails.

Each of the cages 1 could, if desired, be made of sufficient size to accommodate two or more platforms, each carrying a vehicle. If preferred, separate loading and unloading positions could be provided, each having its own operating trolley or other operating member. Arrangements could be made for loading and unloading to be effected at opposite ends of the cages. If preferred, the columns of cages of each unit could be arranged side by side, instead of one behind the other.

I claim:

1. Apparatus for the garaging of vehicles, comprising a lift having at least one cage adapted to receive a vehicle to be garaged and means for moving the cage to and from a loading position at which the vehicle can be loaded into or removed from the cage wherein the apparatus also includes at least one platform, which is adapted to support the vehicle and is movable into and out of the cage at the loading position and operating means for effecting the said movements of the platform, said operating means comprising a reciprocating member adapted to be connected to said platform and on and over which a vehicle is driven when being loaded onto the platform.

2. Apparatus as claimed in claim 1, wherein the lift includes a plurality of cages in which the vehicles are accommodated during storage, with each vehicle supported on a platform.

3. Apparatus as claimed in claim 2, wherein the cages of the lift are arranged one above the other in two columns up and down which and between which they are moved to bring any selected cage to the loading position.

4. Apparatus as claimed in claim 1, wherein the operating means comprise a reciprocating member arranged at the loading position, which member is adapted to engage the platform to move the latter into the cage, and releasable means for connecting the member with the platform when in the cage for the purpose of withdrawing the platform from the cage.

5. Apparatus as claimed in claim 4, wherein the reciprocating member is arranged to engage directly behind the platform to move the latter into the cage and wherein the releasable means comprise a catch, which is biased into its operative position in which it engages the platform for the purpose of withdrawing the latter from the cage, and means for disengaging the catch from the platform when the latter is to be left in the cage.

6. Apparatus as claimed in claim 1, wherein the reciprocating member comprises a trolley on and over which a vehicle is driven when being loaded on to the platform.

7. Apparatus as claimed in claim 6, wherein the trolley is provided with rails running over rollers which are provided at the loading position and which support the trolley.

8. Apparatus as claimed in claim 6, wherein the trolley is provided with wheels running on rails which are provided at the loading position and which support the trolley.

9. Apparatus as claimed in claim 6, wherein the trolley is connected with and operated by a motor-driven chain to which it is connected.

10. Apparatus as claimed in claim 1, wherein the platform is provided with rails running over rollers which are provided at the loading position and in the lift cage and which support the platform.

11. Apparatus as claimed in claim 1, wherein the platform is provided with wheels running on rails which are provided at the loading position and in the cage and which support the platform.

12. Apparatus as claimed in claim 1, wherein the lift comprises a plurality of lift units, arranged side by side with each other, and wherein each lift unit comprises two columns, arranged one behind the other, each column of a unit comprising a plurality of cages which are arranged one above the other and which are movable up and down the columns and between the columns to enable any cage of one unit to be brought to the loading position for that unit.

13. Apparatus as claimed in claim 12, wherein the loading positions for the successive units are arranged side by side with each other and at the same level.

14. Apparatus as claimed in claim 1, wherein raised footways are provided at the loading position between which the platform is moved when a vehicle is to be driven on to it and on to one of which the driver of the vehicle can dismount.

15. Apparatus as claimed in claim 1, wherein the reciprocable member is engageable with the platform at the loading position and which is driven by means of a fluid-pressure-operated ram.

References Cited in the file of this patent
UNITED STATES PATENTS

| | | |
|---|---|---|
| 1,819,513 | James | Aug. 18, 1931 |
| 2,186,854 | Auger et al. | Jan. 9, 1940 |
| 2,412,009 | Rickland | Dec. 3, 1946 |
| 2,446,344 | Smith | Aug. 3, 1948 |
| 2,704,609 | Zeckendorf et al. | Mar. 22, 1955 |
| 2,745,561 | Natkanski | May 15, 1956 |